Nov. 2, 1926.  
S. C. VAN METER  
1,605,876  
SKIRT MARKING APPARATUS  
Filed May 5, 1922   4 Sheets-Sheet 4
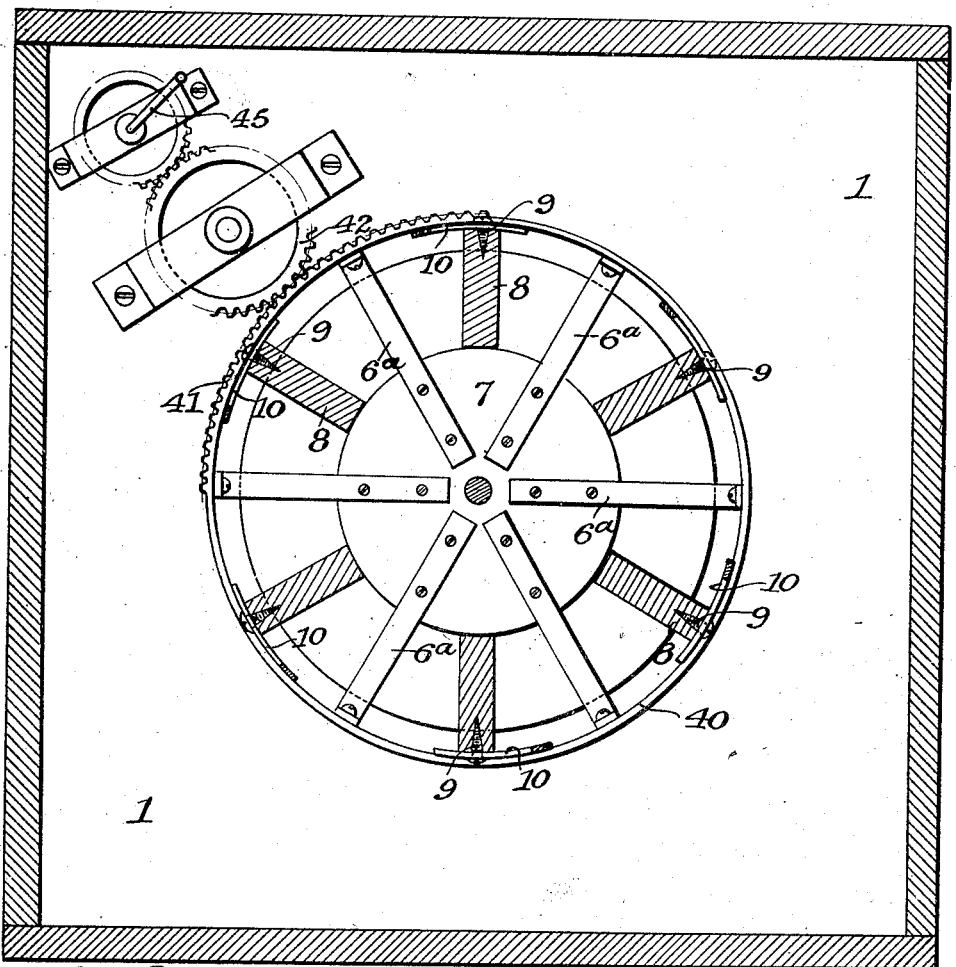
Fig.6.
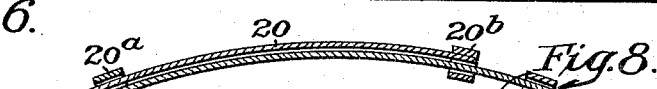
Fig.8.
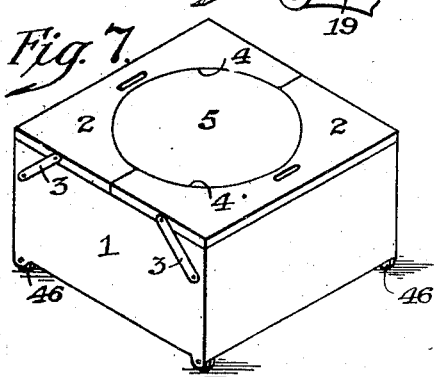
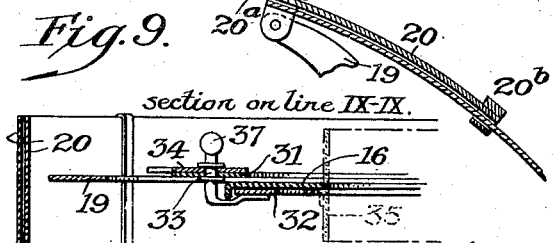
Inventor  
Sarah Chew Van Meter  
by Murray C. Boyer  
Attorney.

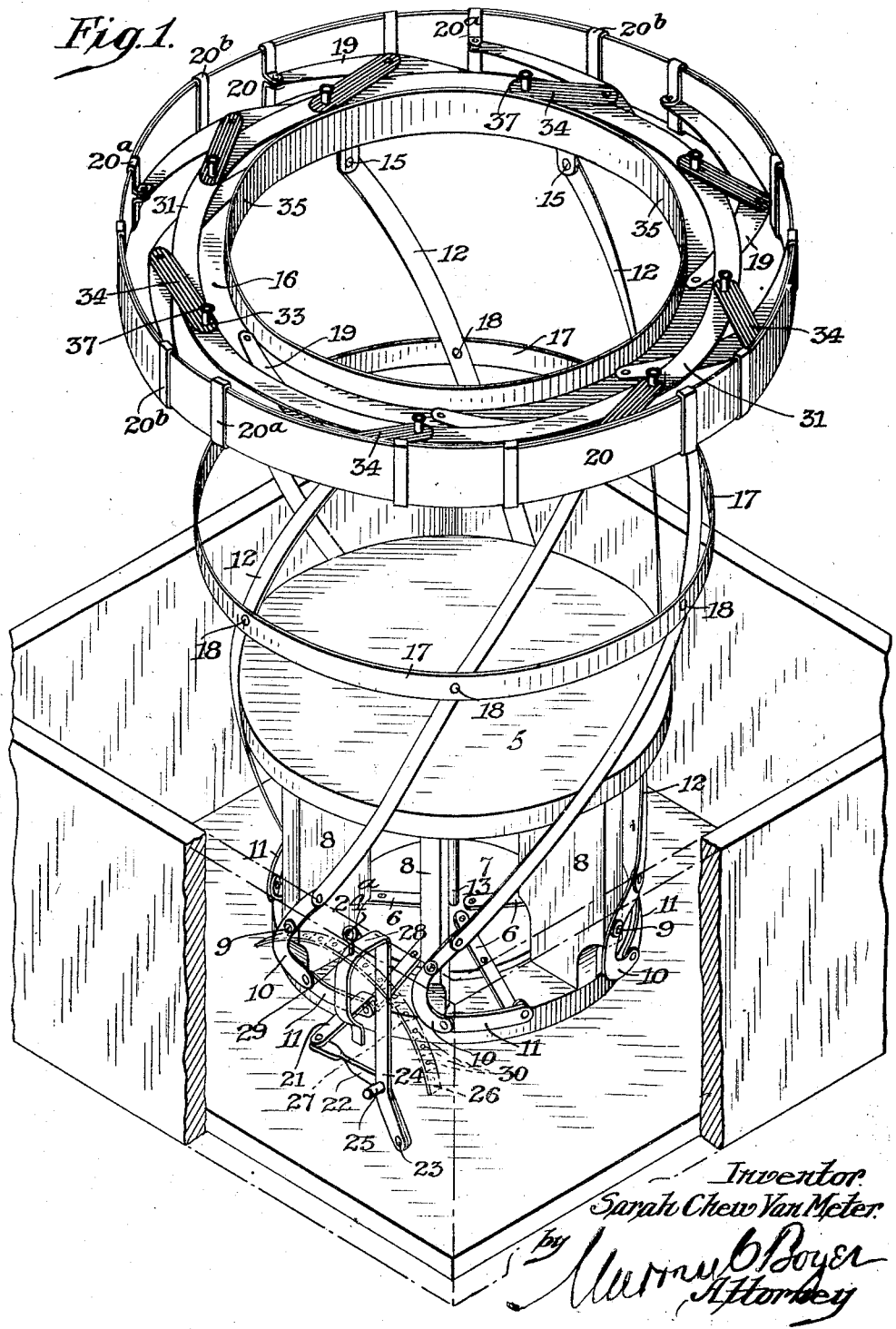

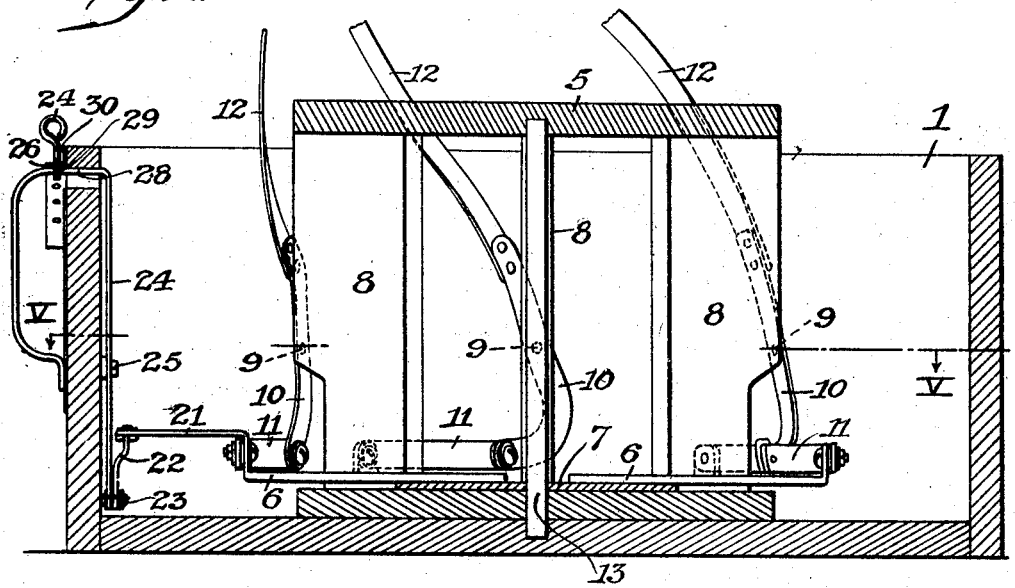
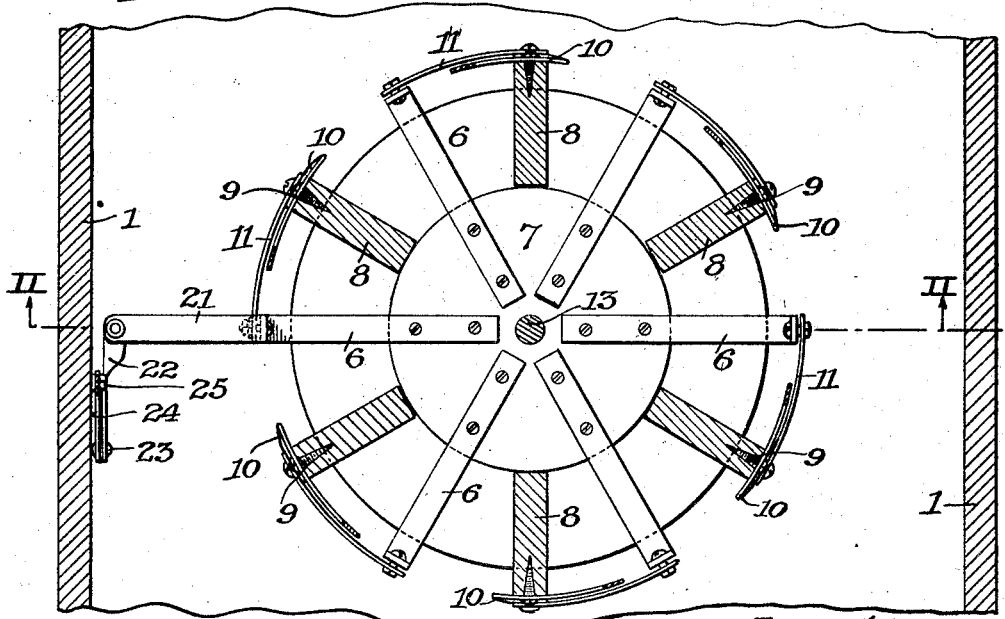

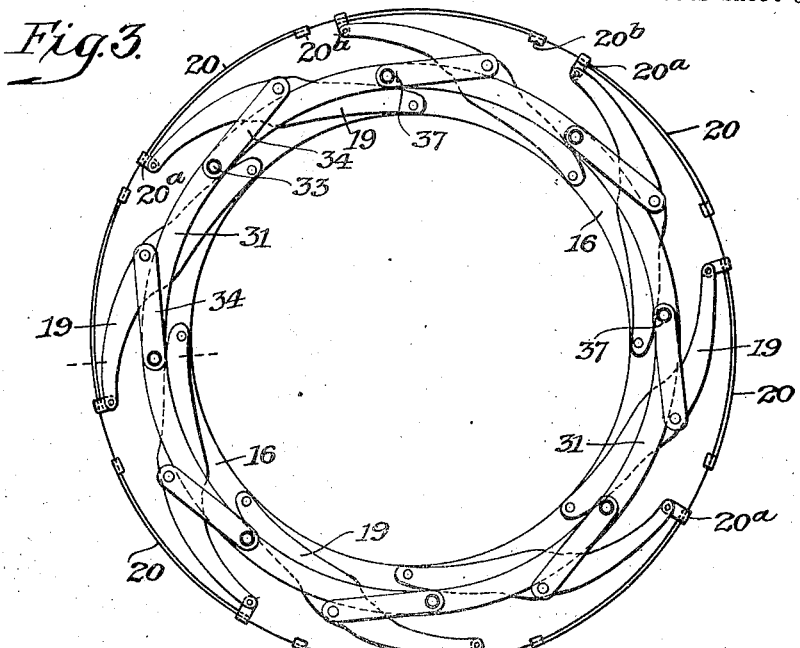
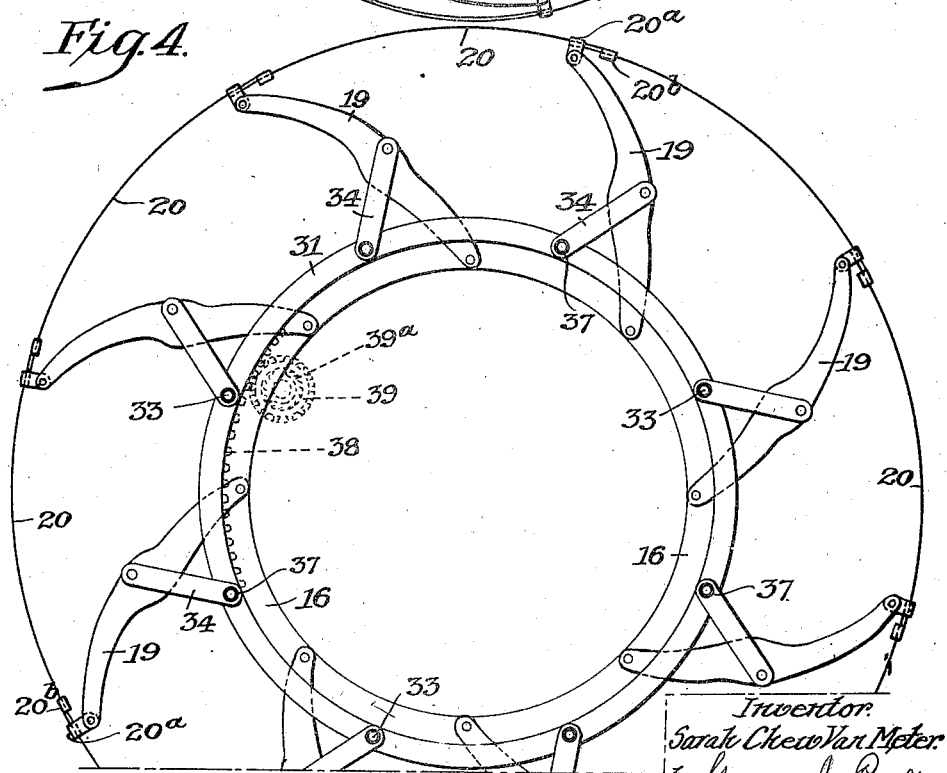

Patented Nov. 2, 1926.

1,605,876

UNITED STATES PATENT OFFICE.

SARAH CHEW VAN METER, OF PHILADELPHIA, PENNSYLVANIA.

SKIRT-MARKING APPARATUS.

Application filed May 5, 1922. Serial No. 558,687.

My invention relates to apparatus employed in the dressmaking art for determining with accuracy the length of skirts draped upon the living form.

One object of my invention is to provide a suitable and efficient device, embodying in a substantially unitary structure, an annular marking rim horizontally disposed and designed to constitute a margin or guide by which the length of a skirt may be determined or measured, with means for gradually elevating or depressing such rim to the height desired for determining the length of the skirt, and a graduated scale for indicating such length; such rim in addition being radially extensible so as to increase its circumferential size, in order that skirts of various dimensions as to width as well as varying dimensions as to length, can be measured easily and accurately by means of the structure forming the subject of my invention.

A further object of my invention is to provide a simple form of extensible and collapsible support for such horizontally disposed annular marking rim.

A further object of my invention is to provide simple and efficient means for actuating said extensible and collapsible support. In the present instance, I have illustrated bell-crank levers suitably controlled, as well as a system of gearing; in both instances the supporting structure being partially rotated when moved to the elevated position or when depressed to the collapsed position, and it will be understood that any equivalent operating mechanism is within the scope of my invention.

A further object of my invention is to provide a fixed stand or support for the person wearing the skirt under measurement, centrally located with respect to the horizontally disposed annular marking rim.

A further object of my invention is to provide a secondary measuring rim inwardly disposed with respect to the main marking rim, and a still further object of my invention is to provide a sectional cover, preferably in halves, which halves are suitably hinged to a box-like base adapted to receive the supporting stand and the measuring members when the latter are collapsed.

These and other features of my invention are more fully described hereinafter, reference being had to the accompanying drawings, in which:

Figure 1, is a perspective view of a skirt-measuring structure embodying my invention.

Fig. 2, is a sectional elevation of the lower portion of the structure, taken on the line II—II, Fig. 5.

Figs. 3 and 4, are plan views showing the measuring or marking rim in the contracted and extended positions respectively.

Fig. 5, is a sectional plan view on the line V—V, Fig. 2.

Fig. 6, is a similar view illustrating modified actuating means within the scope of my invention, and Figs. 7, 8, and 9, are views illustrating details of construction within the scope of my invention.

In the drawings herewith, 1 represents a suitable box-like, base structure which may be provided with sectional cover elements 2, hinged to the sides of the box-like member at 3; each of said cover members being cut out at 4; to fit around and accommodate the circular top of a stand or platform 5, suitably mounted in the base, and firmly connected therewith; such stand being designed to support the wearer of the skirt while the latter is being measured as to length.

In the lower part of the base, I provide a plurality of arms 6, disposed in the form of a spider, which arms may be carried by a circular plate or disk 7, pivotally mounted, and in the present instance, I have shown six of such arms. In addition, the platform 5, upon which the wearer of the skirt may stand during the measuring operation, may have a series of vertical supporting posts 8, also six in number, and pivoted to these posts at 9, are bell-crank levers 10. The short arms of these levers may be connected to links 11; the opposite ends of said links being connected to the ends of the arms 6, while the long arms of said levers may be connected to diagonally disposed flexible members 12, which, normally lying in a collapsed position and relatively flat, may be lifted and partially rotated by movement imparted to the plate 7; the latter being pivotally mounted at 13, substantially centrally with respect to the base of the structure.

The upper ends of the flexible members 12, may be pivotally connected at 15, to a supporting ring 16, and in addition, these flexible members may have a flexible spacing and connecting band 17, to which they may be pivotally connected at 18. The ring 16, may have, pivotally connected thereto, a series of levers 19, the outer ends of which are pivotally connected to vertically disposed segmental members 20, in the form of a flange or marking rim; each of said members 20 being provided with embracing bands 20ª and 20ᵇ whereby they may be telescopically connected with an adjacent member of similar character, and when motion is imparted to said levers, the sections 20, of the marking rim may be extended or contracted to increase or decrease the circumferential length of said outer rim.

The ring 16, is horizontally disposed and the levers 19 are horizontally disposed, preferably connected to the ends of the sections 20, constituting the outer flange or marking rim, so that the latter may constitute a positive gage for determining with accuracy, on a horizontal plane, the length of the skirt.

In order that the ring 16, and its connected parts may be elevated, one of the arms 6, carried by the pivotally mounted plate 7 is extended to provide an engaging portion 21, to which one end of a bell-crank lever 22, is attached, the opposite end of which lever 22, is connected at 23, to an operating lever 24, pivoted at 25, in one of the side walls of the base, and this lever 24 is movable with reference to an arcuate guard 26, preferably graduated as indicated at 27, so that the positions of said operating lever 24 with respect to said arcuate guard will bear a definite relation to the various heights at which the flexible members 12, together with the ring 16, are or may be lifted.

By preference, the operating lever 24, has a portion 28, apertured at 29, and arranged to register with apertures 30, formed in the flange of the arcuate member, and when said members 12 and ring 16, have been lifted to the desired height, the parts may be held by inserting a pin 24ª through the registering openings of the respective members.

In order that the levers 19, connected to the segmental members 20 constituting the annular marking rim, may be moved for the purpose of expanding and contracting said marking rim, I may provide a pair of supplemental rings 31 and 32, movable on and guided by the ring 16. Pivotally connected at 33, to these supplemental rings 31 and 32, are a series of links 34, which are in turn pivotally connected to the levers 19. By imparting rotative or circular movement to these supplemental rings 31 and 32, movement is in turn imparted to the levers 19 by means of the links 34, which in turn imparts circumferential or lateral movement to the several segmental telescoping sections 20, constituting the annular marking rim; such movement, depending upon its direction, effecting an increase or decrease in the circumferential length of said rim.

If desired, the ring 16, carried by the flexible members 12, may be provided with an inner vertical flange 35, to constitute a supplemental measure or gage for narrow skirts; the parts being sufficiently accessible to permit manipulation of a skirt with respect to said flange 35 to determine the length of the same.

In order that the operating rings 31 and 32 may be rotatively moved to effect increase or decrease in the circumferential length of the marking rim, such operating rings may be provided with vertical projections 37 which may be manipulated in one direction or the other to effect such increase or decrease in dimensions. In lieu of this, a portion of the operating rings may be toothed, as indicated at 38, and a suitable pinion 39 may be employed to impart this movement with means in the form of a knob 39ª, for instance, for operating said pinion.

While I have shown a plurality of bell-crank levers, each connected to one of the arms 6, carried by the rotatable plate 7, for effecting movement of the flexible supporting elements upon the rotation of said plate, it is obvious that other mechanism may be employed to accomplish the same result, and as indicated in one such form of mechanism, that shown in Fig. 6, I may provide a racked member connected with said plate; that is to say, I may connect the outer ends of the arms 6ª by an annular rim 40, a portion of which may be toothed, as indicated at 41, and then provide a pinion 42, for engagement with this toothed portion, with a suitable train of gears between the same and an operating member 45, whereby motion may be imparted to said pinion 42, which in turn rotates the toothed rim to move the bell-crank levers and gradually raise the flexible supporting members 12, which are attached at their upper ends to the telescoping sections 20 of the marking rim.

In such instance, the bell-crank levers 10, at the lower ends of the supporting members 12 may be slotted at their pivotal connections with the said toothed rim 40, so that they will accommodate themselves with respect to said rim when the latter is rotated to effect the necessary vertical movement of the members 12. In such form of operating means the racked rim will, of course, be provided with a suitable gage or scale correlated with the gearing employed and the supporting elements, so that the length of the skirt, with respect to the supporting stand, can be accurately determined.

The operating member 45, for the geared device may be of a collapsible type so as to fold into the base of the device when the latter is closed, if desired.

The box-like base is preferably mounted upon wheels or casters 46, so as to be readily movable.

I claim:

1. In a skirt marking device, the combination of a platform having a series of supporting posts, a rotatable plate pivotally mounted with respect to said platform below the same, a plurality of flexible members pivotally connected to said platform-supporting posts, means operatively connecting said flexible members to the rotatable plate, a horizontally disposed marking rim carried by the upper ends of said flexible members, and means for imparting movement to said rotatable plate whereby said flexible members may be moved on their pivots to effect vertical movement of said marking rim.

2. In a skirt marking device, the combination of a base, a platform mounted therein, a series of supporting posts for said platform, a rotatable plate pivotally mounted in the base below said platform, a plurality of flexible members pivotally mounted on said supporting posts, links operatively connecting said flexible members to said rotatable plate, a horizontally disposed marking rim pivotally connected to the upper ends of said flexible members, and means for imparting movement to said rotatable plate whereby said flexible members may be rocked on their pivots to effect vertical movement of said marking rim.

3. In a skirt marking device, the combination of a platform having a series of supporting posts, a rotatable plate pivotally mounted below said platform, a plurality of flexible members, a series of bell-crank levers mounted on said supporting posts and connected at one end to said flexible members, means respectively connecting the opposite ends of said bell-crank levers with the rotatable plate, a horizontally disposed marking rim carried by the upper ends of said flexible members, and means for imparting movement to said rotatable plate whereby said bell-crank levers may be rocked on their pivots to swing the flexible members and effect vertical movement of said marking rim.

4. In a skirt-marking device, the combination of a base, a platform mounted therein, supports for said platform, a rotatable plate pivotally mounted with respect to said platform below the same, a plurality of flexible members, bell-crank levers pivotally mounted on said supports and connected to said flexible members, means connecting said bell-crank levers with the rotatable plate, a horizontally disposed marking rim carried by said flexible members, and means for imparting movement to said rotatable plate whereby said flexible members may be actuated to effect vertical movement of said marking rim.

5. The combination, in a skirt marking device, of a base, a platform mounted therein, supports for said platform, a plate rotatably mounted with respect to said platform below the same, a plurality of bell-crank levers pivotally mounted in said base, links connecting the ends of said bell-crank levers with said rotatable plate, a series of flexible members connected to the opposite ends of said bell-crank levers, and a horizontally disposed marking rim carried at the upper ends of said flexible members; said marking rim being adapted to be raised or lowered by said flexible members upon imparting movement to the rotatable plate.

6. The combination, in a skirt marking device, of a platform, supports for said platform, a plate rotatable on a vertical pivot below said platform and having radial arms, a series of bell-crank levers pivotally connected to said supports and encircling said rotatable plate, links connecting the ends of said bell-crank levers with the arms of said rotatable plate, a series of flexible members connected respectively to the opposite ends of said bell-crank levers, a marking rim carried at the upper ends of said flexible members; said marking rim being adapted to be raised or lowered by said flexible members upon imparting movement to the rotatable plate, and means for adjusting the circumference of said marking rim.

7. In a skirt marking device, the combination of a platform, a series of supporting posts therefor, a series of levers pivotally mounted on said supports, a rotatable plate operatively connected to said levers, a marking rim, collapsing flexible members connecting said levers and the marking rim and circumferentially movable with respect to the platform, and means for actuating said rotatable plate to move the pivoted levers and simultaneously impart movement to the flexible members connected to the marking rim to effect vertical movement of the latter.

8. In a skirt-marking device, the combination of a platform, vertical supports for said platform, bell-crank levers pivotally mounted on said supports, a rotatable plate mounted below said platform and having radial arms, links connecting one end of each of said levers with an arm of the rotatable plate, a horizontally disposed marking rim, a concentric ring inwardly disposed forming a support therefor, flexible supporting members fixed to said bell-crank levers and pivotally connected at their opposite ends to said ring support, means for actuating said rotatable plate to move the levers on their pivots and simultaneously impart movement to the flexible members connected to the ring support for the marking rim to effect vertical movement of the latter, and means connected to said plate for limiting the movement of the rotatable plate to hold said marking rim at various elevations.

9. In a skirt-marking device, the combination of a fixed platform, a marking rim encircling the same; said rim being made up of a support and a plurality of segmental sections slidably disposed with respect to each other, means for imparting movement to said sections to expand and contract said marking rim with respect to its support, and means for vertically moving said marking rim.

10. In a skirt-marking device, the combination of a fixed platform, a vertically movable marking rim encircling said platform; said rim being made up of a flanged support and a plurality of segmental sections slidably disposed with respect to each other, a rotatable ring carried by said flanged support and disposed within said marking rim, and means connected to said ring for imparting movement to said sections to expand and contract said marking rim with respect to its flanged support.

11. In a skirt-marking device, the combination of a fixed platform, a marking rim encircling said platform and vertically movable with respect to the same; said rim being made up of a plurality of segmental sections slidably disposed with respect to each other, means for effecting vertical movement of said marking rim, a circular flanged support for the same, levers pivotally mounted on said flanged support and connected to the segmental sections forming said marking rim for expanding and contracting the circumference of the same, and means for actuating said levers.

12. In a skirt-marking device, the combination of a collapsible marking rim, a circular flanged support for the same, a series of flexible members connected to said flanged support, rotatable means operatively connected to said flexible members for imparting movement to the same to effect vertical movement of the flanged support for said rim; the latter being made up of a plurality of telescopically disposed sections, levers pivotally connected to said flanged support and to said sections for expanding and contracting the sections forming said marking rim, a circumferentially movable ring surrounding said flanged support, and links connecting said ring with the sections of the marking rim whereby rotative movement imparted to the ring will effect expansion and contraction of said sections.

13. The combination, in a skirt marking device, of a continuous marking rim, a circular carrier for the same; said marking rim being made up of a plurality of segmental sections slidably disposed with respect to each other, a pair of rings rotatably mounted with respect to said carrier, levers pivoted at one end to one of said rings and at the opposite end to the sections of the marking rim, and means connecting said levers with the other of said rotatable rings whereby rotative movement of the latter will be transmitted to said levers to move said segmental sections with respect to each other and effect expansion or contraction of said marking rim.

14. The combination, in a skirt marking device, of a continuous marking rim, a circular carrier for the same, means for imparting vertical movement to said carrier; said marking rim being made up of a plurality of segmental sections slidably disposed with respect to each other, a pair of rings rotatably mounted with respect to said carrier, levers pivoted at one end to one of said rings, and means connecting said levers with the other of said rotatable rings whereby rotative movement of the latter will be transmitted to said levers to move said segmental sections with respect to each other and effect expansion or contraction of said marking rim.

15. In a skirt-marking device, the combination of a fixed platform, spaced supports for said platform, bell-crank levers pivotally mounted on said supports, a rotatable plate pivotally mounted below said platform and having radial arms extending between the supports of the same, links connecting one end of each of said levers with an arm of the rotatable plate, a horizontally disposed marking rim vertically movable with respect to said platform, flexible supporting members fixed to said bell-crank levers and operatively connected to the marking rim, means for actuating said rotatable plate to move the levers on their pivots and simultaneously impart swinging movement to the flexible members connected to the marking rim to effect vertical movement of the latter, and means for holding said marking rim against vertical movement.

16. In a skirt marking device, the combination of a platform, a series of supporting posts therefor, a rotatable plate pivotally mounted on a vertical axis below the platform, a plurality of flexible members pivotally mounted on said platform-supporting posts, means operatively connecting said flexible members to the rotatable plate, a horizontally disposed marking rim carried by the upper ends of said flexible members, and means for moving said rotatable plate on its axis whereby said flexible members may be rocked on their pivots circumferentially of the platform to effect vertical movement of said marking rim.

17. In a skirt marking device, the combination of a base, a platform mounted therein, a series of supporting posts for said platform, a rotatable plate pivotally mounted on a vertical axis below said platform, a plurality of flexible members pivotally mounted on said supporting posts, links connecting said flexible members to said rotatable plate, a horizontally disposed marking rim carried by the upper ends of said flexible members, and means for moving said rotatable plate on its axis whereby said flexible members may be rocked to effect vertical movement of said marking rim.

18. In a skirt marking device, the combination of a platform, a series of supporting posts for the same, a rotatable plate pivotally mounted on a vertical axis below said platform, a plurality of flexible members circumferentially disposed with respect to said platform, a series of bell-crank levers pivotally mounted on said supporting posts and connected to said members, links respectively connecting the opposite ends of said bell-crank levers with the rotatable plate, a horizontally disposed marking rim carried by the upper ends of said flexible members, and means for moving said rotatable plate on its axis whereby said bell-crank levers may be moved on their pivots and swing the flexible members to effect vertical movement of said marking rim.

In witness whereof I have signed this specification.

SARAH CHEW VAN METER.